United States Patent
Ozsoylu et al.

(10) Patent No.: US 12,275,384 B2
(45) Date of Patent: Apr. 15, 2025

(54) FAULT-TOLERANT BRAKE SYSTEM

(71) Applicant: ZF Active Safety US Inc., Livonia, MI (US)

(72) Inventors: Suat Ozsoylu, Rochester Hills, MI (US); Blaise J. Ganzel, Ann Arbor, MI (US)

(73) Assignee: ZF ACTIVE SAFETY US INC., Livonia, MI (US)

( * ) Notice: Subject to any disclaimer, the term of this patent is extended or adjusted under 35 U.S.C. 154(b) by 162 days.

(21) Appl. No.: 18/076,437

(22) Filed: Dec. 7, 2022

(65) Prior Publication Data

US 2024/0190397 A1    Jun. 13, 2024

(51) Int. Cl.
*B60T 13/68* (2006.01)
*B60T 7/04* (2006.01)
*B60T 13/74* (2006.01)

(52) U.S. Cl.
CPC ............ *B60T 7/042* (2013.01); *B60T 13/686* (2013.01); *B60T 13/745* (2013.01); *B60T 2270/402* (2013.01); *B60T 2270/404* (2013.01)

(58) Field of Classification Search
CPC ...... B60T 7/042; B60T 13/686; B60T 13/745; B60T 2270/402; B60T 2270/404; B60T 2270/40
See application file for complete search history.

(56) References Cited

U.S. PATENT DOCUMENTS

| | | | |
|---|---|---|---|
| 2009/0243376 A1* | 10/2009 | Tahara | B60T 8/3225 303/3 |
| 2016/0167632 A1* | 6/2016 | Deng | B60T 8/4086 701/70 |
| 2020/0216052 A1* | 7/2020 | Campau | B60T 13/745 |

* cited by examiner

*Primary Examiner* — Jacob M Amick
(74) *Attorney, Agent, or Firm* — Tarolli, Sundheim, Covell & Tummino LLP

(57) ABSTRACT

A brake system includes a tandem power transmission unit selectively driven by a first electric motor to provide pressurized hydraulic fluid to primary and secondary output lines. A plurality of iso/dump control valve arrangements is provided, with each being associated with a selected wheel brake and selectively provides slip control to the selected wheel brake. A first traction control iso valve is hydraulically interposed between the tandem power transmission unit and at least a selected iso/dump control valve arrangement via the primary output line. A second traction control iso valve is hydraulically interposed between the tandem power transmission unit and at least an other iso/dump control valve arrangement via the secondary output line. A DAP power transmission unit is driven by a second electric motor for selectively providing pressurized hydraulic fluid to the iso/dump control valve arrangement of at least one associated wheel brake.

11 Claims, 1 Drawing Sheet

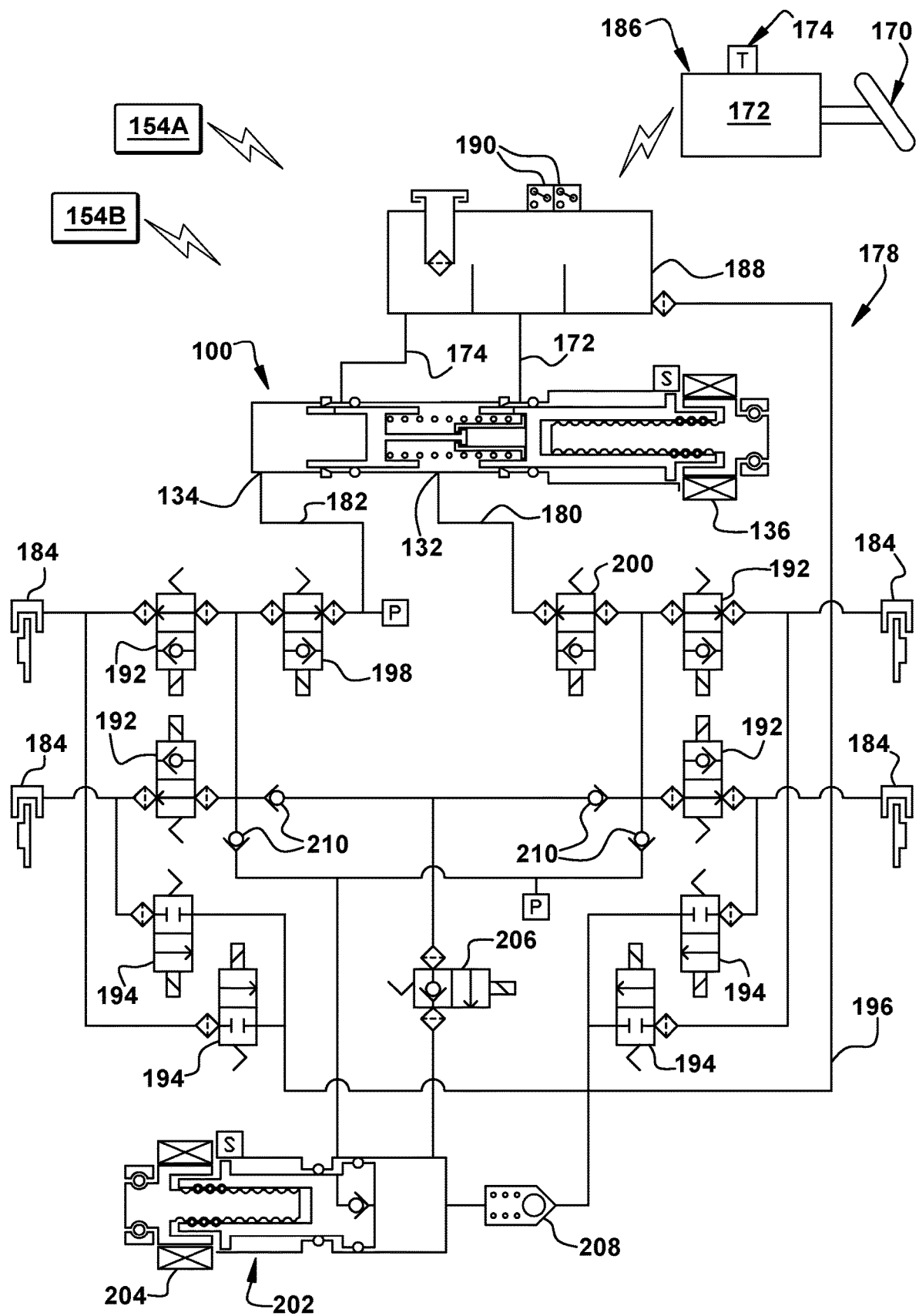

FAULT-TOLERANT BRAKE SYSTEM

TECHNICAL FIELD

This disclosure relates to an apparatus and method for use of a fault-tolerant brake system and, more particularly, to methods and apparatus of a fault tolerant brake system using two power transmission units.

BACKGROUND

A brake system may include anti-lock control including a pedal-operated hydraulic braking pressure generator, a braking pressure modulator which is provided in the pressure fluid conduits between the braking pressure generator and the wheel brakes and which serves to vary the braking pressure by changing the volume of a chamber containing the hydraulic fluid, sensors for determining the wheel rotational behavior, and electronic circuits for processing the sensor signals and for generating braking-pressure control signals. Brake systems may also include both anti-lock control and traction slip control, which can use braking pressure modulators for controlled vehicular braking.

Descriptions of prior art brake systems are in U.S. Pat. No. 10,730,501, issued 4 Aug. 2020 to Blaise Ganzel and titled "Vehicle Brake System with Auxiliary Pressure Source", in U.S. Patent Application Publication No. 2020/0307538, published 1 Oct. 2020 by Blaise Ganzel and titled "Brake System with Multiple Pressure Sources", in U.S. Patent Application Publication No. 2022/0274575, published 1 Sep. 2021 by Blaise Ganzel and titled "Hydraulic Brake Boost", and in U.S. patent application Ser. No. 17/708,070, filed 30 Mar. 2022 by Blaise Ganzel and titled "Tandem Power Transmission Unit and Brake Systems Using Same" (hereafter referenced as "the '070 application"), all of which are incorporated herein by reference in their entirety for all purposes.

SUMMARY

In an aspect, a brake system is disclosed. A tandem power transmission unit is selectively driven by a first electric motor to provide pressurized hydraulic fluid to primary and secondary output lines. A plurality of wheel brakes is provided. A plurality of iso/dump control valve arrangements is provided. Each iso/dump control valve arrangement is associated with a selected wheel brake of the plurality of wheel brakes and selectively provides slip control to the selected wheel brake. A first traction control iso valve is hydraulically interposed between the tandem power transmission unit and at least a selected iso/dump control valve arrangement via the primary output line. A second traction control iso valve is hydraulically interposed between the tandem power transmission unit and at least an other iso/dump control valve arrangement via the secondary output line. A DAP power transmission unit is associated with at least one wheel brake of the plurality of wheel brakes. The DAP power transmission unit is driven by a second electric motor for selectively providing pressurized hydraulic fluid to the iso/dump control valve arrangement of the at least one associated wheel brake. A reservoir is hydraulically connected to the tandem power transmission unit, the DAP power transmission unit, and each of the iso/dump control valve arrangements. An electronic control unit is operative to control at least one of the first and second electric motors.

BRIEF DESCRIPTION OF THE DRAWINGS

For a better understanding, reference may be made to the accompanying drawings, in which:

FIG. 1 is a schematic hydraulic diagram of a brake system according to an aspect of the present invention.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

FIG. 1 schematically depicts an example brake system 178 for actuating a plurality of wheel brakes 184. The brake system 178 is operable in normal non-failure and backup braking modes, with the latter being employed, for example, in the event of failure of one or more components of the brake system 178. The brake system 178 is shown here as a hydraulic braking system, in which fluid pressure is utilized to apply braking forces for the brake system 178. The brake system 178 may suitably be used on a ground vehicle, such as an automotive vehicle having four wheels with a wheel brake associated with each wheel. Furthermore, the brake system 178 can be provided with other braking functions such as anti-lock braking (ABS) and other slip control features to effectively brake the vehicle. Components of the brake system 178 may be housed in one or more blocks or housings. The blocks or housings may be made from solid material, such as aluminum, that has been drilled, machined, or otherwise formed to house the various components. Fluid conduits may also be formed in the block or housing.

In the illustrated embodiments of the brake system 178 of FIG. 1, there are four wheel brakes 184, which each can have any suitable wheel brake structure operated electrically and/or by the application of pressurized brake fluid. Each of the wheel brakes 184 may include, for example, a brake caliper mounted on the vehicle to engage a frictional element (such as a brake disc) that rotates with a vehicle wheel to effect braking of the associated vehicle wheel. The wheel brakes 184 can be associated with any combination of front and rear wheels of the vehicle in which the corresponding brake system 178 is installed. For example, the brake system 178 may be configured as a vertically split or diagonally split system. No differentiation is made herein among the wheel brakes 184, for the purposes of this description, though one of ordinary skill in the art could readily provide a suitable braking arrangement for a particular use environment.

Also for the sake of description, it is presumed that a deceleration signal transmitter (shown schematically at 186) is configured to provide a braking signal, in a wired or wireless manner, corresponding to a desired braking action by an operator of the vehicle. The deceleration signal transmitter 186 could include, but not be limited to, a brake pedal, an autonomous braking controller, and/or any other suitable scheme for generating a braking signal from which the brake system 178 can be actuated. The deceleration signal transmitter 186 shown in FIG. 1 has a brake pedal 170 connected to a brake pedal unit 172 and selectively actuated by a driver of the vehicle to indicate a desired braking command. The brake pedal unit 172 has a brake sensor 174 for determining a position of the brake pedal 170 and responsively producing a braking signal corresponding to the desired braking command.

The brake system 178 also include a fluid reservoir 188. The reservoir 188 stores and holds hydraulic fluid for the brake system 1788. The fluid within the reservoir 188 is preferably held at or about atmospheric pressure, but the fluid may be stored at other pressures if desired. The reservoir 188 is shown schematically having three tanks or sections with fluid conduit lines connected thereto. The sections can be separated by several interior walls within the reservoir 188 and are provided to prevent complete drainage of the reservoir 188 in case one of the sections is depleted due to a leakage via one of the three lines connected to the reservoir 188. Alternatively, the reservoir 188 may include multiple separate housings. The reservoir 188 may include at least one fluid level sensor 190 (two shown in FIG. 1, for redundancy) for detecting the fluid level of one or more of the sections of the reservoir 188.

The brake system 178 includes a tandem power transmission unit ("PTU") 100, which functions as a source of pressure to provide a desired pressure level to the hydraulically operated wheel brakes 184 during a typical or normal non-failure brake apply. The tandem PTU 100 could be, for example, the tandem PTU disclosed in the '070 application. After a brake apply, fluid from the wheel brakes 184 may be returned to the tandem PTU 100 and/or be diverted to the reservoir 188. It is also contemplated that other configurations (not shown) of the brake system 178 could include hydraulic control of just selected one(s) of the wheel brakes (with the others being electrically controlled/actuated). One of ordinary skill in the art would be readily able to provide such an arrangement for a desired use environment, following aspects of the present invention.

An iso/dump control valve arrangement is associated with each wheel brake 184 of the plurality of wheel brakes 184, with each iso/dump control valve arrangement being configured to selectively provide slip control to the selected wheel brake 184. Each iso/dump control valve arrangement includes an iso valve 192 and a dump valve 194, for providing desired fluid routing to an associated wheel brake 184. The reservoir 188 is hydraulically connected to the tandem PTU 102 and to each of the iso/dump control valve arrangements, such as via the return line 196. The iso/dump control valve arrangements each include respective serially arranged iso and dump valves 192 and 194. The normally open iso valve 192 for each iso/dump control valve arrangement is located hydraulically between a respective wheel brake 184 and the tandem PTU 100, and the normally closed dump valve 194 for each iso/dump control valve arrangement is located hydraulically between a respective wheel brake 184 and the reservoir 188, for the corresponding wheel brake 184.

The iso/dump control valve arrangements may selectively provide slip control to at least one wheel brake 184 powered by the tandem PTU 100 and/or the DAP power transmission unit described below. More broadly, the iso/dump control valve arrangement, and/or other valves of the brake system 100, any of which may be solenoid-operated and have any suitable configurations, can be used to help provide controlled braking operations, such as, but not limited to, ABS, traction control, vehicle stability control, dynamic rear proportioning, regenerative braking blending, and autonomous braking.

A first traction control iso valve 198 is hydraulically interposed between the tandem PTU 100 and at least one iso/dump control valve arrangement via the first output channel 132 (here, at least a selected iso/dump control valve arrangement via primary output line 180). A second traction control iso valve 200 is hydraulically interposed between the tandem PTU 100 and at least one iso/dump control valve arrangement via the second output channel 134 (here, at least an other iso/dump control valve arrangement via secondary output line 182).

A dual-acting plunger type ("DAP") power transmission unit ("PTU") 202 is associated with at least one wheel brake 184 of the plurality of wheel brakes 184. The DAP PTU 202 is hydraulically connected to the reservoir and is driven by a second electric motor 204 (as differentiated from the [first] electric motor 136 included in the tandem PTU 100) for selectively providing pressurized hydraulic fluid to the iso/dump control valve arrangement of at least one wheel brake 184 which is associated with the DAP PTU 202. The DAP PTU 202 can be considered to comprise a secondary brake module of the brake system 178.

The secondary brake module (here, DAP PTU 202) of the brake system 178 functions as a source of pressure to provide a desired pressure level to selected ones of the wheel brakes 184 in a backup or "failed" situation (i.e. backup braking mode), when, for some reason, the tandem PTU 100 is unable to provide fluid to those selected wheel brakes 184. The secondary brake module can be used to selectively provide hydraulic fluid to at least one of the wheel brakes 184 in a backup braking mode, but also in an enhanced braking mode, which can occur on its own and/or concurrently with either the backup braking mode or a non-failure normal braking mode. Examples of suitable enhanced braking mode functions available to the brake system 178 include, but are not limited to, "overboost" (in which higher pressure is provided to a particular brake than would normally be available from the tandem PTU 100 alone) and "volume-add" (in which more fluid is provided to a particular brake than would normally be available from the tandem PTU 100). One of ordinary skill in the art will be readily able to configure a brake system 178 for any particular use application as desired.

A normally closed DAP valve 206 is interposed hydraulically between the DAP PTU 202 and the tandem PTU 100. A replenishing check valve 208 is located fluidically between the reservoir 188 and the DAP PTU 202. When present, the replenishing check valve 208 may be provided to assist with refilling of the DAP PTU 202 (or components thereof) under predetermined conditions. For example, the replenishing check valve 208 may help to facilitate refilling of the chamber in front of the DAP head when the DAP PTU 202 is building pressure during its retraction stroke by pushing fluid out of the annular chamber behind the DAP head. This is done, for example, during slip control if additional flow to the brakes is needed after the DAP PTU 208 is stroked fully forward.

A plurality of check valves 210 is interposed hydraulically between the DAP PTU 202 and at least one of the first and second traction control iso valves 198 and 200. When present, the plurality of check valves 210 is configured to selectively resist flow of hydraulic fluid between the primary and secondary output lines 180 and 182 and accordingly at least partially prevent loss of at least one wheel brake 184 when the brake system 178 is in a backup braking mode.

In many use environments, the tandem PTU 100 will provide pressurized hydraulic fluid to at least one wheel brake 184 at least when the brake system 178 is in the normal non-failure braking mode. The DAP PTU 202 accordingly can provide pressurized hydraulic fluid to at least one wheel brake 184 at least when the brake system 178 is in the backup braking mode. It is also contemplated that one or both of the tandem PTU 100 and the DAP PTU 202 could be configured to provide pressurized hydraulic fluid when the brake system 178 is in the "other" of the normal non-failure or backup braking modes, as desired.

In some use environments of the brake system 178, the DAP PTU 202 may be able to pull hydraulic fluid directly from the reservoir 188. During certain phases of operation, the DAP PTU 202 may provide pressurized fluid to the tandem PTU 100 via the primary and/or secondary output lines 180, 182, in a manner that tends to "backdrive" the tandem PTU 100. Because there is no brake pedal attached to the tandem PTU 100 this "backdrive" feature may be desirable in some circumstances to facilitate brake venting, to avoid working the first electric motor 136 and the second electric motor 204 against each other, or for any other desired reason.

The brake system 178 also includes at least one electronic control unit ("ECU") 154, with first and second ECUs 154A, 154B being shown and described herein. The ECUs 154A, 154B may include microprocessors and other electrical circuitry. The ECUs 154A, 154B receive various signals, process signals, and control the operation of various electrical components of a corresponding brake system 178 in response to the received signals, in a wired and/or wireless manner. For example, the braking signal from the brake pedal unit 172 may be transmitted to at least one ECU 154 in a wired and/or wireless manner, with the ECU(s) 154A, 154B controlling at least one of the tandem PTU 100 and the DAP PTU 202 responsive to the braking signal. It is also contemplated that the brake system 178 could be wholly autonomous, with braking signals originating with one or more ECU(s) 154A, 1154B or being transmitted to at least one ECU 154 from a vehicle controller external to the brake system 178.

The ECUs 154A, 154B can be connected to various sensors such as the reservoir fluid level sensor(s) 190, pressure sensors, travel sensors, switches, wheel speed sensors, and steering angle sensors. The ECUs 154A, 154B may also be connected to an external module (not shown) for receiving information related to yaw rate, lateral acceleration, longitudinal acceleration of the vehicle, or other characteristics of vehicle operation for any reason, such as, but not limited to, controlling the brake system 100 during vehicle braking, stability operation, or other modes of operation. Additionally, the ECUs 154A, 154B may be connected to the instrument cluster for collecting and supplying information related to warning indicators such as an ABS warning light, a brake fluid level warning light, and a traction control/vehicle stability control indicator light. It is contemplated that at least one of the ECUs 154A and 154B may be, for example, integrated into the tandem PTU 100 and/or the DAP PTU 202.

The first ECU 154A is operative to control the first electric motor 136 of the tandem PTU 100. The second ECU 154B is operative to control the second electric motor 204 of the DAP PTU 202, at least one of the iso/dump control valve arrangements, and at least one of the first and second traction control iso valves 198, 200. An example of a suitable ECU 154 arrangement is disclosed in co-pending U.S. patent application Ser. No. 17/708,019, filed 30 Mar. 2022 and titled "Control Arrangement for a Brake System", which is incorporated by reference herein in its entirety for all purposes.

One or more of the various iso valves 192, dump valves 194, first and second electric motors 136 and 204, and first and second traction control iso valves 198 and 200 may be of a "dual wound" type and/or may have a single wound coil with two separated drive circuits in the brake system 178. As a result, both of the first and second ECUs 154A and 154B are capable of operating such "redundantly configured" valves as desired. Through the redundancy of the electric motors on the tandem PTU 100 and the DAP PTU 202, and on the dual windings of the valves of the brake system 178, either of the first and second ECUs 154A and 154B would be capable of controlling an entire so-equipped brake system 178, should the other ECU be unavailable.

It is contemplated that various other components, such as electric service and/or parking brake motors, could be provided by one of ordinary skill in the art to achieve desired configurations for particular use environments, in any of the brake systems 178 described herein. For example, while a number of filters and pressure sensors are shown in the FIGURES, specific description thereof has been omitted herefrom for brevity, as one of ordinary skill in the art will readily understand how to provide a desired number, placement, and/or operation of filters, sensors, and any other components as desired for a particular use environment of the present invention.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the FIGURES is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or FIGURES unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the FIGURES, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the FIGURES. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

We claim:

1. A brake system, comprising:
a tandem power transmission unit selectively driven by a first electric motor to provide pressurized hydraulic fluid to primary and secondary output lines;
a plurality of wheel brakes;
a plurality of iso/dump control valve arrangements, each iso/dump control valve arrangement being associated with a selected wheel brake of the plurality of wheel brakes and selectively providing slip control to the selected wheel brake;
a first traction control iso valve hydraulically interposed between the tandem power transmission unit and at least a selected iso/dump control valve arrangement via the primary output line;
a second traction control iso valve hydraulically interposed between the tandem power transmission unit and at least an other iso/dump control valve arrangement via the secondary output line;
a DAP power transmission unit associated with at least one wheel brake of the plurality of wheel brakes, the DAP power transmission unit being driven by a second electric motor for selectively providing pressurized hydraulic fluid to the iso/dump control valve arrangement of the at least one associated wheel brake;
a reservoir hydraulically connected to the tandem power transmission unit, the DAP power transmission unit, and each of the iso/dump control valve arrangements; and
an electronic control unit operative to control at least one of the first and second electric motors.

2. The brake system of claim 1, wherein the electronic control unit is a first electronic control unit operative to control the first electric motor; and the brake system includes a second electronic control unit operative to control the second electric motor, at least one of the iso/dump control valve arrangements, and at least one of the first and second traction control iso valves.

3. The brake system of claim 1, wherein each iso/dump control valve arrangement includes a normally open iso valve and a normally closed dump valve for providing desired fluid routing to an associated wheel brake.

4. The brake system of claim 3, wherein each normally open iso valve is located hydraulically between a respective wheel brake and the tandem power transmission unit, and each normally closed dump valve is located hydraulically between a respective wheel brake and the reservoir.

5. The brake system of claim 1, including a normally closed DAP valve interposed hydraulically between the DAP power transmission unit and the tandem power transmission unit.

6. The brake system of claim 1, including a replenishing check valve interposed hydraulically between the reservoir and the DAP power transmission unit, the replenishing check valve selectively assisting with refilling of the DAP power transmission unit.

7. The brake system of claim 1, including a plurality of check valves interposed hydraulically between the DAP power transmission unit and at least one of the first and second traction control iso valves, the plurality of check valves being configured to selectively resist flow of hydraulic fluid between the primary and secondary output lines and accordingly at least partially prevent loss of at least one wheel brake when the brake system is in a backup braking mode.

8. The brake system of claim 1, including a brake pedal connected to a brake pedal unit and selectively actuated by a driver of the vehicle to indicate a desired braking command, the brake pedal unit having a brake sensor for determining a position of the brake pedal and responsively producing a braking signal corresponding to the desired braking command, the braking signal being transmitted to the electronic control unit, and the electronic control unit controlling at least one of the tandem power transmission unit and the DAP power transmission unit responsive to the braking signal.

9. The brake system of claim 8, wherein the braking signal is wirelessly transmitted to the electronic control unit.

10. The brake system of claim 1, being operable in normal non-failure and backup braking modes.

11. The brake system of claim 10, wherein the tandem power transmission unit provides pressurized hydraulic fluid to at least one wheel brake at least when the brake system is in the normal non-failure braking mode, and the DAP power transmission unit provides pressurized hydraulic fluid to at least one wheel brake at least when the brake system is in the backup braking mode.

* * * * *